E. J. BRYANT.
BORING TOOL HOLDER.
APPLICATION FILED JAN. 19, 1915.
1,153,673.
Patented Sept. 14, 1915.
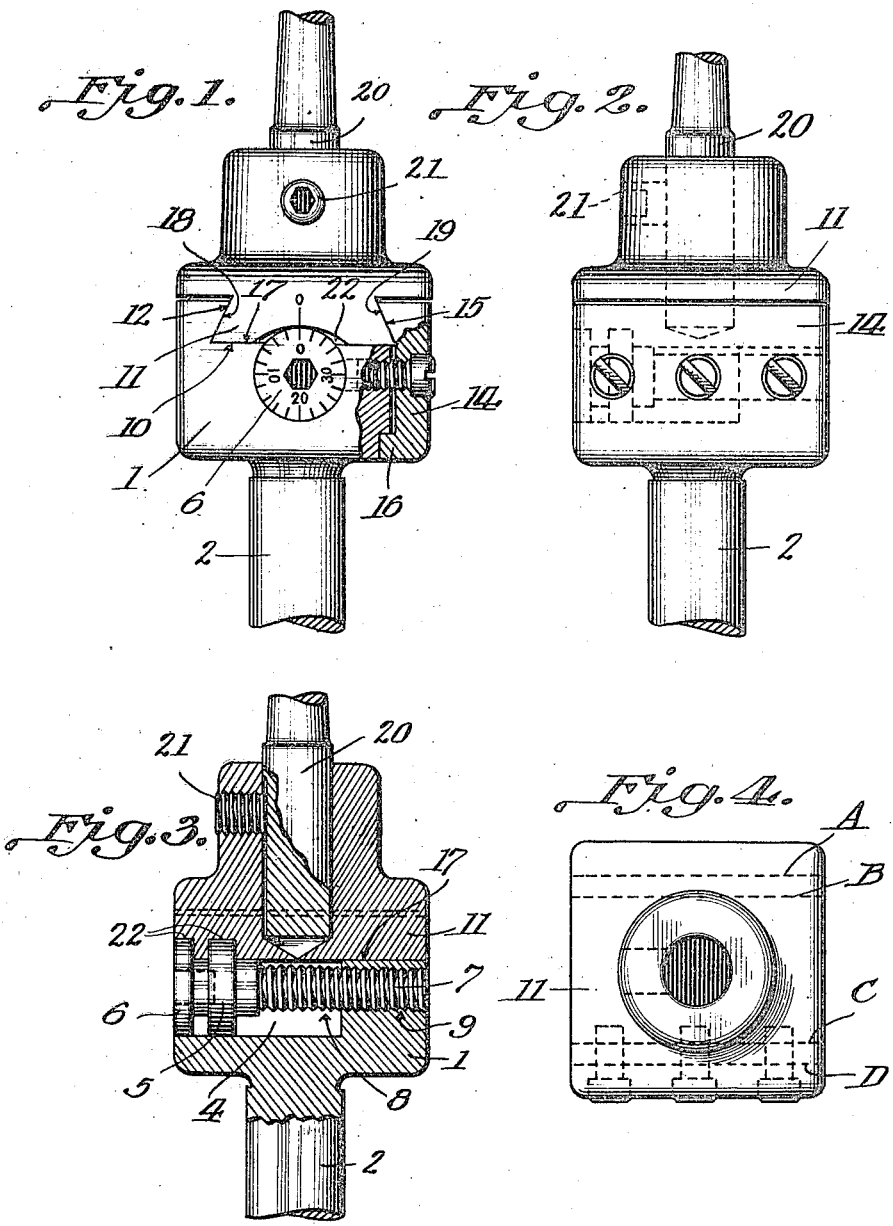

UNITED STATES PATENT OFFICE.

ELMER J. BRYANT, OF WOONSOCKET, RHODE ISLAND, ASSIGNOR TO THE TAFT PEIRCE MANUFACTURING COMPANY, OF WOONSOCKET, RHODE ISLAND, A CORPORATION OF RHODE ISLAND.

BORING-TOOL HOLDER.

1,153,673.

Specification of Letters Patent. Patented Sept. 14, 1915.

Application filed January 19, 1915. Serial No. 3,050.

*To all whom it may concern:*

Be it known that I, ELMER J. BRYANT, a citizen of the United States, and a resident of the city of Woonsocket, in the county of Providence, State of Rhode Island, have invented new and useful Improvements in Boring-Tool Holders, of which the following is a specification.

This invention relates broadly to tools and more specifically to a boring tool holder.

The principal object of this invention is to construct a boring tool holder with an adjustable cross head with the parts constructed and arranged to support the boring tool in adjusted positions with substantially the same rigidity as if it were supported by a one piece holder.

Another object of this invention is to construct a boring tool holder having a movable cross head controlled by a micrometer screw, with a vise clamp guideway to rigidly hold the cross head in any predetermined adjusted position.

A still further object of this invention is to construct a boring tool holder provided with a movable cross head controlled by a micrometer screw, wherein both ends of said micrometer screw are flush at all times with the parallel surfaces on the cross head.

Another object of this invention is to provide a boring tool holder having a movable cross head controlled by a micrometer screw, with a clamp member constructed to be adjustable to maintain substantially uniform pressure throughout the entire face of the cross head engaged by the said clamp.

Other and further objects of this invention will in part be obvious and will in part be pointed out hereinafter by reference to the accompanying drawings wherein like characters are used to designate like parts throughout the several figures thereof.

Figure 1 is an elevational front view showing the micrometer head, and a portion of the device in section. Fig. 2 is an elevational side view. Fig. 3 is a sectional view taken substantially on the center plane and showing the micrometer screw construction. Fig. 4 is a plan view looking directly at the tool holding end of the holder.

Boring tool holders having movable cross heads are old in the art, but difficulty has been found in constructing these devices in such manner as to enable the device to be used with precision in working to very close dimensions. Also, heretofore, in constructing devices of this character various set screws, adjusting screws, etc., have extended beyond the body of the device itself, thereby adding to the liability of the operator's clothing being caught, and thus increasing the possibility of accident. It has also heretofore been common in the art to construct devices of this character with body portions of cylindrical form, hence necessitating the metal supporting the guideways of the cross heads to be of non-uniform thickness, namely, thinnest where the arc of the cylinder cuts the edge of the guideway at each end thereof, and thickest at the intersection of a plane passing through the axis of the cylinder and perpendicular to the line of feed of the cross head. In such a construction it is substantially impossible to clamp the cross head in off-set position and maintain substantially uniform pressure throughout the clamping surface of the head.

The present invention, which will hereinafter be described more in detail by reference to the drawings, is designed particularly with reference to extreme rigidity and strength, and in the present case the body portion of the tool is substantially that of a parallelepiped. This construction admits of substantially uniform metal on each side of the guideway. One side, in the present case, comprising a clamping member supported by a plurality of machine screws which are capable of adjustment to maintain substantially uniform pressure on the entire length of the clamping face for any predetermined position of the cross head, thereby insuring a uniform absorption of all stresses transmitted from the boring tool to the boring tool holder. The clamping jaw in the present invention is constructed to operate on the principle of a third class lever having equal length lever arms; thereby evenly distributing stresses set up throughout the entire body portion, and because of the pivotal action of this clamp and the inclination of the clamping surface to securely and positively wedge the cross head against the body portion.

Referring now more particularly to the drawings, the body portion 1 of the boring tool holder is provided with a cylindrical shank portion 2 adapted to accurately fit the openings of standard size chucks or tail stocks. The body portion is provided with a cylindrical recess 4 to accommodate the longitudinal movement of the disk-shaped heads 5 and 6 on the outer end of the micrometer screw 7. This micrometer screw is threaded as at 8 to accurately fit the threads formed at the back of the body portion as at 9, Fig. 3. The upper part of the body portion is accurately surfaced at 10, to provide an accurate working surface or seat for the transversely movable cross head 11. The body portion adjacent the surface 10 is carried upward and is provided with an inclined surface 12 which forms one side of the guideway for the cross head 11. The edges of the inclined surface 12 are substantially parallel to the sides of the body portion adjacent thereto, as will be seen from dotted lines A and B, Fig. 4, so it will be noted that the metal intermediate the inclined surface 12 and the adjacent side of the body portion is substantially of uniform cross section. A clamp 14 is provided on its upper end with an inclined surface 15 and on its lower edge is provided with an offset 16 constructed to be seated in a right angle recess formed in the lower edge of the body portion 1. A line of machine screws is set in substantially the transverse central line of the said clamp 14, and passing through openings therein, engage with threads formed in the body portion 1. It will be noted that the inclined surface 15 is bounded by lines which are substantially parallel to the outer surface of the clamp 14, as will be seen from dotted lines C and D, Fig. 4. The cross head 11 is accurately surfaced on the lower portion thereof, as at 17, to form a rigid seat with reference to the body portion, and it is also accurately surfaced at the sides, as at 18 and 19, to engage with the inclined surfaces 12 and 15 previously specified. The outer end of the cross head 11 is bored to provide an opening for the reception of the shank of a boring tool 20, and is provided with a safety set screw 21 to maintain said boring tool in position in the holder. The cross head 11 is formed with arch-shaped openings 22 near the front edge thereof, to provide for the reception of the disk-shaped heads 5 and 6 on the micrometer screw 7. The outer face of the disk 5 is graduated to form a scale with relation to the zero indicated on the face of the cross head 11. The micrometer screw 7 is provided with a hexagonal opening of exactly the same size as the opening in the safety set screw 21, so that one plug wrench will operate both devices. By reference particularly to Fig. 3, it will be noted that both ends of the micrometer screw 7 terminate substantially in the same plane as the sides of the cross head, in order that when the cross head is moved to off-set position, no parts extend beyond the cross head itself.

Referring now generally to the figures in the drawings, it will be noted that the boring tool constituting the invention herein is so constructed as to be substantially symmetric with reference to any stresses which may be set up therein. Particularly is this true since the axis of the micrometer screw crosses at right angles the axes of the boring tool 20 and the cylindrical shank 2. This relationship does not change when the cross head is moved from normal position, that is, the axis of the boring tool and the axis of the cylindrical shank still intersect the axis of the micrometer screw. Furthermore, as has been explained, the metal of the clamp guideway is substantially uniform in both the stationary and the clamping jaw, and as the clamping screws are uniformly arranged with reference to the pivot of the clamping jaw and its clamping face, it will be noted that these screws may be tightened to maintain substantially uniform pressure for any adjusted position of the cross head, and furthermore, because of the pivotal arrangement of the clamping side, the forces of the clamping screws acting through the inclined surface at the upper end of the clamp tends to wedge the surfaces 10 and 17 together. These surfaces, it will be seen, are at right angles to the axes of the boring tool and cylindrical shank, and also it will be noted that the inclined clamping surfaces are equi-distant on each side from the axes of the boring tool and the cylindrical shank.

Realizing that it is physically possible to vary somewhat, the particular construction herein illustrated without departing from the spirit of my invention, I desire that the specific construction herein shown and described be considered as illustrative and not in a limiting sense, except by such interpretation as the prior art may impose upon the appended claims.

Having thus described my invention what I desire to claim is:—

1. In a boring tool holder in combination, a body portion, a rigid clamping jaw formed integral with said body portion, said clamping jaw being of a substantially uniform cross section throughout its length, a movable clamping jaw opposite to said rigid clamping jaw, said movable clamping jaw being provided with a fulcrum at one edge thereof and a clamping face on the opposite edge thereof, said movable clamping jaw being of substantially uniform cross section throughout its length, a plurality of clamping screws for operating said clamping jaw, said body portion being provided with a smooth surface intermediate said clamping jaws, a transversely movable cross head intermediate said clamping jaws and adapted to be seated against said smooth surface when said clamp screws are operated to tighten the movable clamping jaw, a micrometer screw, and means carried by said micrometer screw for engaging with said movable cross head to move said cross head when said micrometer screw is turned.

2. In a boring tool holder in combination, a body portion, a fixed clamping jaw carried by said body portion, a shank for supporting said body portion, a transversely movable cross head secured to said body portion, a clamping jaw provided on its lower edge with a longitudinally extending pivotal member and on its upper edge with a longitudinally extending clamping face, and means to swing said clamping jaw on said pivot to lock said cross head in predetermined positions, said pivoted clamping jaw comprising the entire side portion of said tool holder and being of a length substantially equal to the length of said movable cross head.

3. A boring tool holder provided with a shank, a body portion, a movable cross head carried within said body portion, means to lock said cross head in adjusted positions, said parts being constructed and arranged so that when said cross head is in zero position said boring tool holder is a parallelepiped with a shank on one side thereof, and a tool holder on the opposite side thereof, and the remaining four sides all being substantially plane surfaces.

4. In a boring tool holder in combination, a body portion, a shank integral with said body portion, a fixed clamping jaw, a movable clamping jaw, a cross head having a depending member intermediate said clamping jaws, a longitudinal pivot on one edge of said movable clamping jaw, and means to swing said clamping jaw on said pivot to securely clamp said cross head in adjusted positions, said clamping jaw comprising the entire side portion of said tool holder and being of a length substantially equal to the length of said cross head.

5. In a boring tool holder in combination, a body portion, a shank carried by said body portion, a cross head in movable relation to said body portion, means for adjusting said cross head in movable positions, a boring tool holder upon said cross head, said body portion and said cross head forming substantially a parallelepiped bounded by substantially four plane surfaces, there being substantially no projections extending outwardly from said surfaces when the axis of the boring tool holder and the axis of the shank are alined.

6. In a boring tool holder in combination, a body member, a cross head member mounted for movement upon said body member, one of said members being provided with a transverse cylindrical opening and having a screw threaded opening leading from said transverse cylindrical opening, the axes of said openings both being in the same line, a micrometer screw fitting in said screw threaded opening, a cylindrical head upon said micrometer screw, said cylindrical head being substantially of the same diameter as said cylindrical opening and adapted to travel therein when said micrometer screw is operated, and means in engagement with said cylindrical head to move one of said members transversely relative to the other when said micrometer screw is rotated.

ELMER J. BRYANT.

Witnesses:
 ROY J. SOULER,
 EDNA WORSNOP.